United States Patent [19]
Kita

[11] Patent Number: 5,172,103
[45] Date of Patent: Dec. 15, 1992

[54] IMAGE DISPLAY APPARATUS
[75] Inventor: Kouichi Kita, Tochigi, Japan
[73] Assignee: Kabushiki Kaisha Toshiba, Kawasaki, Japan
[21] Appl. No.: 754,665
[22] Filed: Sep. 4, 1991
[30] Foreign Application Priority Data
  Sep. 4, 1990 [JP] Japan ................. 2-236833
[51] Int. Cl.$^5$ ............................ G09G 1/06
[52] U.S. Cl. ................... 340/731; 340/814; 358/22
[58] Field of Search .......... 340/721, 723, 731, 717, 340/716, 814, 728; 395/155, 156, 157, 158, 159, 160, 161; 358/148, 22, 451; 382/47

[56] References Cited
U.S. PATENT DOCUMENTS
4,725,892 2/1988 Suzuki et al. ................. 340/728

FOREIGN PATENT DOCUMENTS
0165883 8/1985 Japan .

Primary Examiner—Alvin E. Oberley
Assistant Examiner—Matthew Luu
Attorney, Agent, or Firm—Oblon, Spivak, McClelland, Maier & Neustadt

[57] ABSTRACT

An image display apparatus includes an image memory for storing at least one original image defined by predetermined original image parameters including at least original image size data $S_R$, original image pixel size data $\Delta l_R$, and magnification data $\alpha$ with respect to an object, a D/A converter and a display for displaying an externally supplied image which is defined by predetermined display parameters including at least display size data $S_D$ and display pixel size data $\Delta l_D$, and an enlargement/reduction processor, a transfer controller, a display controller, and a console for reading out the original image stored in the image memory, changing the image parameters of the readout original image in association with the display parameters, and supplying the image whose image parameters are changed to the D/A converter and the display.

26 Claims, 8 Drawing Sheets

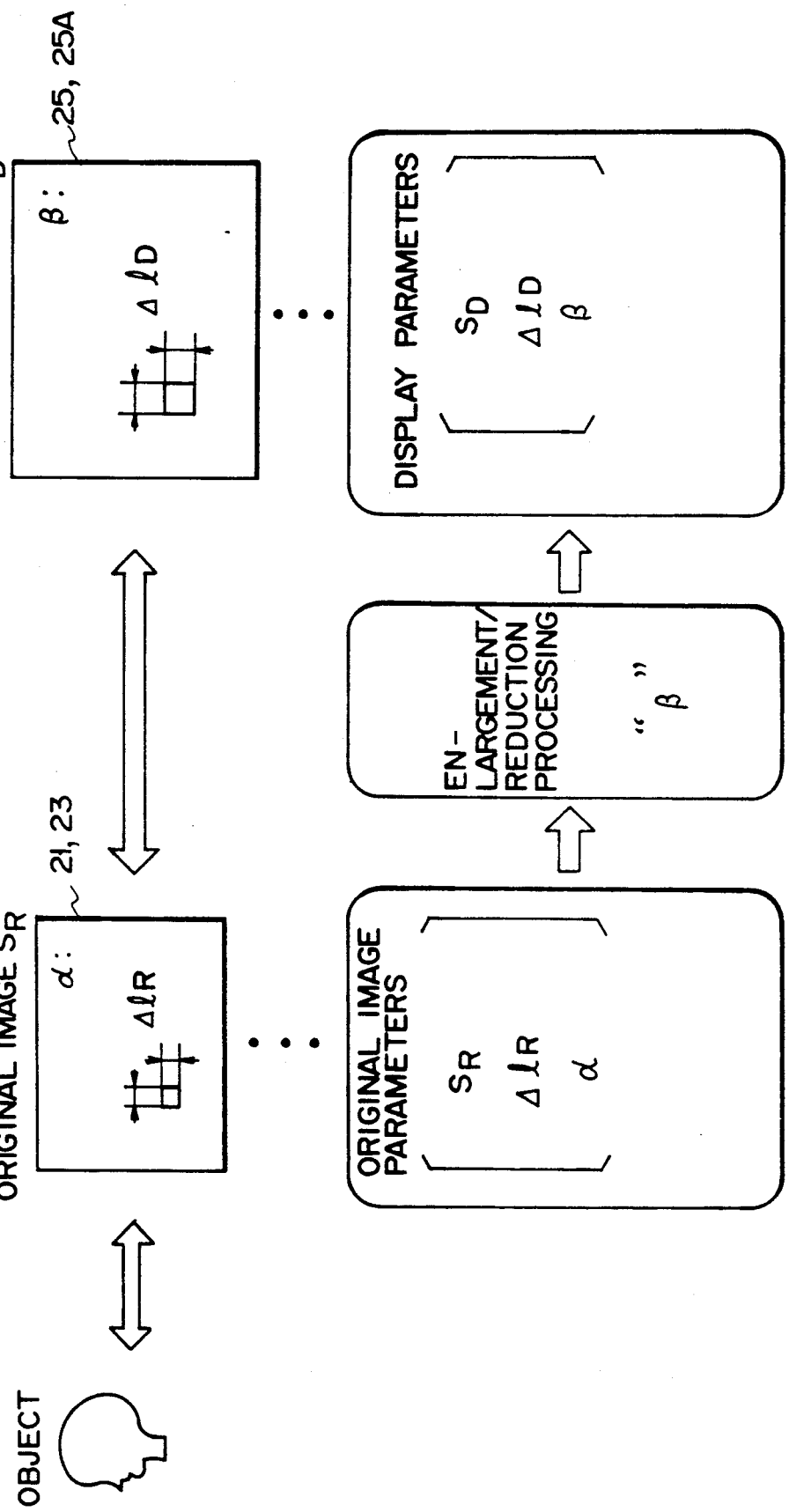
F I G. 3

IMAGE DISPLAY APPARATUS

BACKGROUND OF THE INVENTION

1. Field of the Invention

The present invention relates to an image display apparatus such as an image network system, a medical work station, and the like.

2. Description of the Related Art

When two, e.g., old and new images obtained by imaging an identical patient are visually compared, whether an anomalous substance in the two images corresponds to a pulmonary carcinoma or the section of a blood vessel is determined with reference to the size of the ROI, and a degree of blurring of a portion around the ROI. A doctor compares a tumor size and a region of interest on a film. However, input original image data do not always have a constant pixel size, and display screens of CRT displays used as display means do not always have a constant pixel size.

Therefore, in a conventional image display apparatus, even if a plurality of original image data to be displayed have a constant pixel size in units of original image data, images are displayed while being reduced or enlarged in proportion to the display sizes (inch sizes) of CRT displays to be used. For example, a display screen of a 19" CRT display having a 1,000×1,000 pixel matrix has a vertical size of about 40 cm, and a display screen of a 15" CRT display having a 1,000×1,000 pixel matrix has a vertical size of about 24 cm. Such a difference in size between the display screens changes the size of an image to be displayed.

For this reason, it is difficult to directly observe a plurality of images displayed on CRT displays and to compare and judge ROIs in images. Therefore, a plurality of images displayed on the CRT displays are developed on a film, and the above-mentioned judgment is made using the film. But, the above-mentioned judgement has not enough been put into practical use.

A scale may be displayed in the vicinity of an image displayed on the CRT display. With reference to this scale, the sizes of a plurality of images are converted to the same unit in mind, so that the plurality of images to be compared have the same size, thus making the above-mentioned judgment.

SUMMARY OF THE INVENTION

It is an object of the present invention to provide an image display apparatus which can display images on a display screen at a predetermined ratio, allows easy direct judgment of the size of an object, and can improve observation efficiency.

In order to achieve the above object, there is provided an image display apparatus comprising:

storage means for storing at least one original image defined by predetermined original image parameters including at least original image size data $S_R$, original image pixel size data $\Delta l_R$, and magnification data $\alpha$ with respect to an object;

display means for displaying an externally supplied image which is defined by predetermined display parameters including at least display size data $S_D$ and display pixel size data $\Delta l_D$; and changing means for reading out the original image stored in the storage means, changing the image parameters of the readout original image in association with the display parameters, and supplying the image whose image parameters are changed to the display means.

Furthermore, in order to achieve the above object, there is provided an image network system comprising:

a work station including storage means for storing at least one original image defined by predetermined original image parameters including at least original image size data $S_R$, original image pixel size data $\Delta l_R$, and magnification data $\alpha$ with respect to an object, display means for displaying an externally supplied image which is defined by predetermined display parameters including at least display size data $S_D$ and display pixel size data $\Delta l_D$, and changing means for reading out the original image stored in the storage means, changing the image parameters of the readout original image in association with the display parameters, and supplying the image whose image parameters are changed to the display means;

a plurality of image input apparatuses;

at least one image database; and a network for connecting the work station, the plurality of image input apparatuses, and the at least one image database.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a chart illustrating enlargement/reduction processing in the work station according to the embodiment of the present invention;

DETAILED DESCRIPTION OF THE PREFERRED EMBODIMENTS

The preferred embodiments of the present invention will be described hereinafter with reference to the accompanying drawings.

Figure 1:
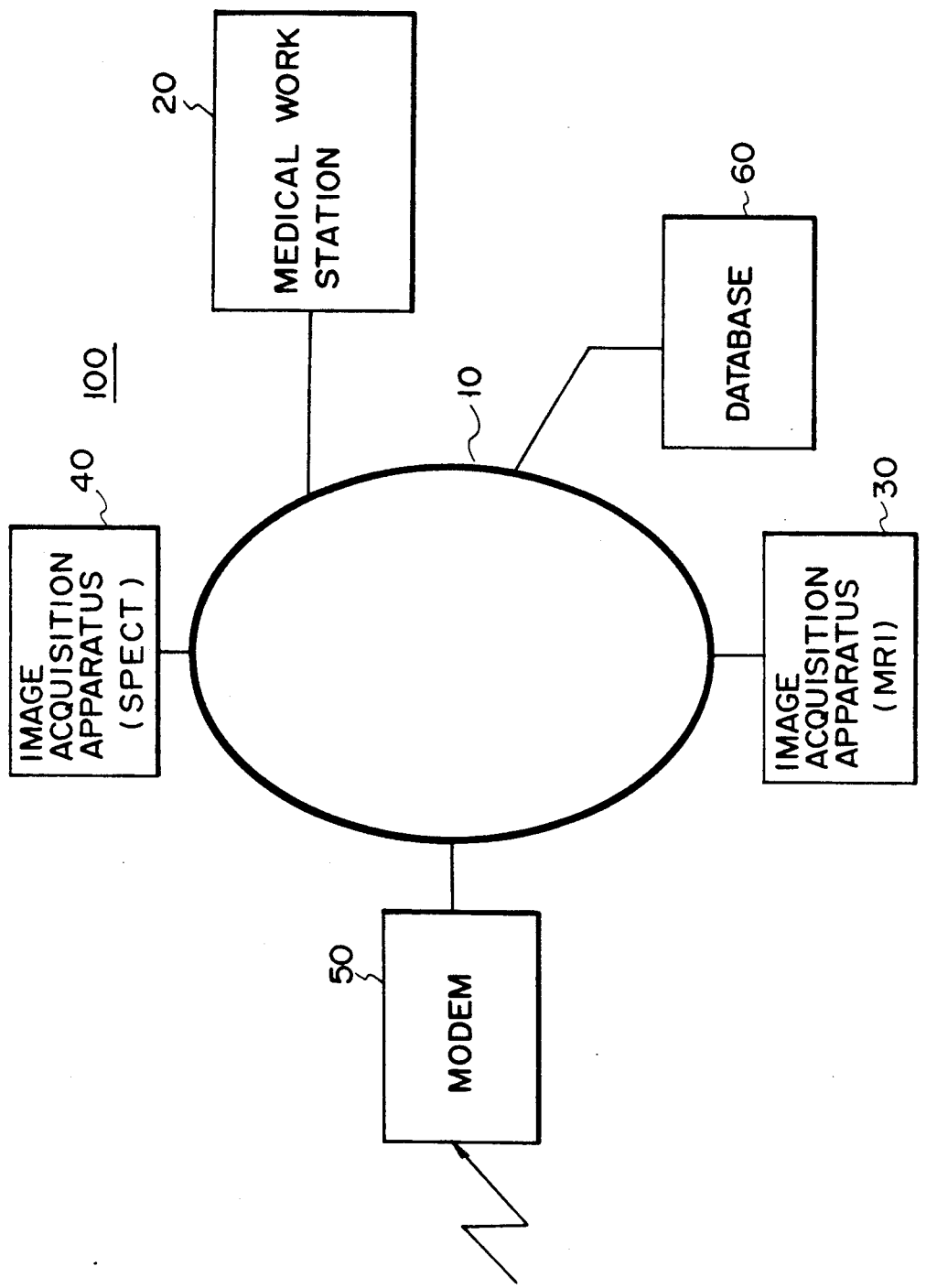
FIG. 1 is a block diagram showing an image network system according to the present invention.
Figure 2:
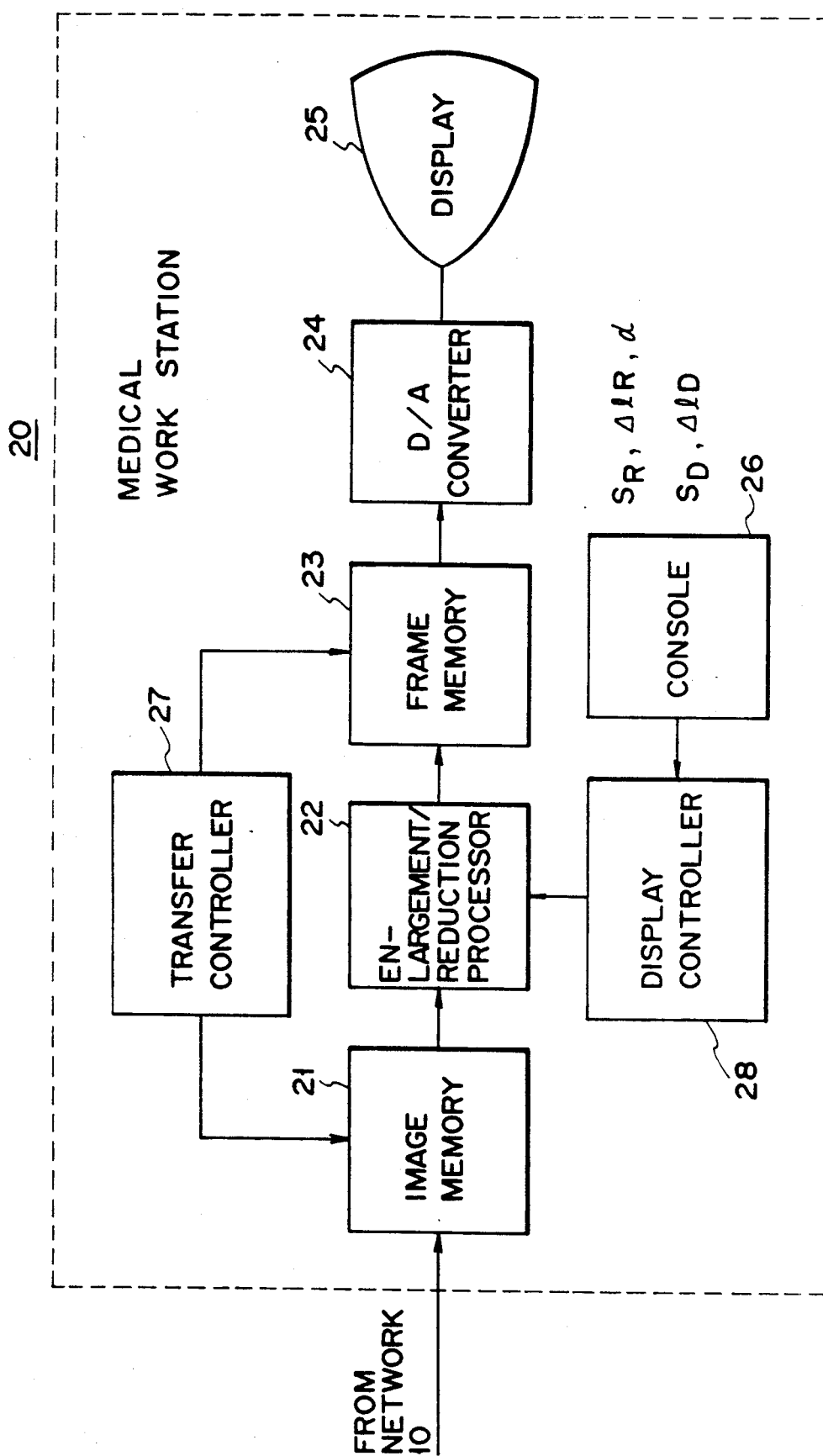
FIG. 2 is a block diagram showing the first embodiment of a medical work station which can be connected to the image network system shown in FIG. 1.

As shown in FIG. 1, the present invention is embodied as an image network system. The present invention is characterized by a medical work station connected to the image network system.

In an image network system 100 of the present invention, a network 10 for transmitting image data is connected to a medical work station 20, a first image acquisition apparatus 30 such as an MRI apparatus (magnetic resonance imaging apparatus), a second image acquisition apparatus 40 such as an SPECT apparatus (single photon emission CT apparatus), a modem 50 for interfacing with a communication network, and an image database 60. The modem 50 can fetch an image obtained by a medical imaging apparatus through a cable or radio communication network such as a public network. The image database 60 stores images having various modalities fetched from the first and second image acquisition apparatuses 30 and 40, and the modem 50 as original images.

The medical work station 20 displays images obtained from the first and second image acquisition apparatuses 30 and 40, and the modem 50 directly or after predetermined image processing of the images.

The medical work station 20 comprises an image memory 21 for storing a plurality of original image data each including original image size data $S_R$ and original image pixel size data $\Delta l_R$ as original image parameters, an enlargement/reduction processor 22 for enlarging/reducing an original image, a frame memory 23 for storing a processed image, i.e., an image enlarged/reduced by the enlargement/reduction processor 22, a D/A converter 24 for converting digital image data into analog data, a CRT display 25 for displaying the processed image stored in the frame memory 23, a console 26 for setting a display magnification $\alpha$ of an image to be displayed on a display screen 25A of the CRT display 25 in units of $\sqrt{2}$ times (e.g., 2, $\sqrt{2}$, $1/\sqrt{2}$, 1/2), a transfer controller 27 for transferring image data in a designated region of interest (ROI) in the image memory 21 to a designated position of the frame memory 23, and a display controller 28 for outputting enlargement/reduction ratio data to the enlargement/reduction processor 22.

The display screen 25A of the CRT display 25 is defined by display size data SD and display pixel size data $\Delta l_D$ as display parameters. The display size data $S_D$ and the display pixel size data $\Delta l_D$ are stored in advance in the enlargement/reduction processor 22, the console 26, or the display controller 28.

The console 26 is used for manually inputting the original image size data $S_R$, the original pixel size data $\Delta l_R$, the magnification $\alpha$, the display size data $S_D$, and the display pixel size data $\Delta l_D$, as needed.

The display controller 28 calculates an enlargement/reduction ratio $\beta$ on the basis of the original image pixel size data $\Delta l_R$ and the display pixel size data $\Delta l_D$ and the display magnification data $\alpha$ of the display screen 25A of the CRT display 25, so that an image displayed on the display screen 25A of the CRT display 25 can be displayed in a given scale even when the pixel sizes $\Delta l_R$ and $\Delta l_D$ are changed while the display magnification $\alpha$ is constant, and outputs the enlargement/reduction ratio data $\beta$ to the enlargement/reduction processor 22. The enlargement/reduction ratio $\beta$ is given by the following equation (1):

$$\beta = (\Delta l_R / \Delta l_D) \cdot \alpha \qquad (1)$$

The enlargement/reduction processor 22 enlarges/reduces an original image stored in the image memory 21 on the basis of the enlargement/reduction ratio data $\beta$ sent from the display controller 28, and transfers the enlarged/reduced image to the frame memory 23.

The transfer controller 27 changes a transfer address to the frame memory 23 so as to be able to desirably change a display position on the display screen 25A of the CRT display 25. Thus, a plurality of images can be displayed at split (e.g., 4-split) positions or arbitrary positions on the display screen 25A of the CRT display 25. This realizes a multi-display mode. When all the original image data cannot be displayed on the display screen 25A of the CRT display 25 at the ratio $\beta$ calculated by the display controller 28, the transfer controller 27 transfers the image data to the frame memory 23 while changing, e.g., a designated region of the image memory 21, so that all the original image data can be displayed. This operation is called a "scroll" operation.

Note that the work station 20 has a "clip mode" and an "overlap mode". In the "clip mode", data are transferred from the image memory 21 into only a designated region in the frame memory 23. This operation realizes a multi-window display operation. In the "overlap mode", all the image data in a designated region of the image memory 21 can be transferred to the frame memory 23. These modes can be selectively realized by setting a counter arranged in the transfer controller 27. In the clip mode, a partial or one-to-one correspondence image display is made on the display screen 25A of the CRT display 25. In the overlap mode, an image is displayed to fall outside a designated display region on the display screen 25A of the CRT display 25. The input display magnification $\alpha$ is preferably selected from fixed values such as 2, $\sqrt{2}$, $1/\sqrt{2}$, and 1/2 rather than an arbitrary magnification so as to standardize a diagnostic reference, thus improving diagnostic efficiency.

The operation of the work station 20 of the present invention will be described below with reference to FIG. 3. FIG. 3 is considered to be a proper illustration for the sake of understanding of the operation of the work station 20.

The following description will be made under the assumption that the pixel size $\Delta l_R$ of original image data is 400 μm, the display pixel size $\Delta l_D$ of the display play screen 25A of the CRT display 25 is 300 μm when the size of the CRT display 25 is 19" and when the aspect ratio of the display screen 25A is 4:3, and the display magnification $\alpha$ is 3.

The display controller 28 calculates the enlargement/reduction ratio $\beta$ on the basis of the original image pixel size data $\Delta l_R$ (e.g., 400 μm), the pixel size data $\Delta l_D$ (e.g., 300 μm) of the display screen 25A of the CRT display 25, and the display magnification data $\alpha$ (e.g., 3) in accordance with equation (2) as follows:

$$\beta/\alpha = \Delta l_R/\Delta l_D \quad (2)$$
$$\beta = (\Delta l_R/\Delta l_D) \cdot \alpha$$
$$= (400/300) \cdot 3$$
$$= 4$$

The enlargement/reduction processor 22 enlarges image data at this ratio $\beta$ (e.g., 4), and transfers the enlarged data to the frame memory 23. Thus, a ×4 enlarged image is displayed on the display screen 25A of the CRT display 25.

Figure 4:
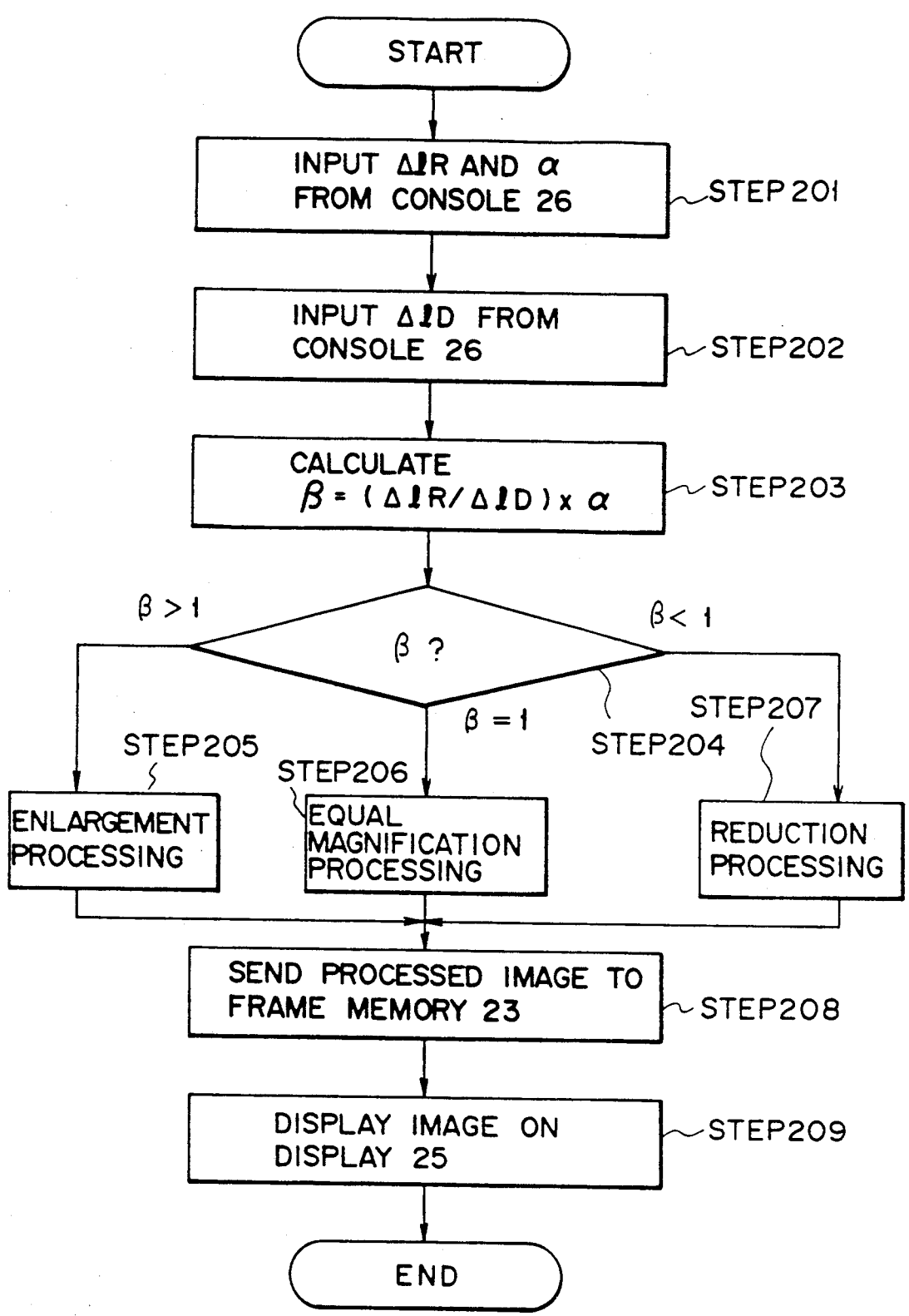
FIG. 4 is a flow chart showing an enlargement/reduction processing sequence of the work station according to the embodiment of the present invention.

The above-mentioned operations can be expressed as a flow chart as shown in FIG. 4 as time elapses. More specifically, in step 201, $\Delta l_R$ and $\alpha$ are input from the console 26. Then, in step 202, $\Delta l_D$ is input from the console 26. In step 203, the enlargement/reduction processor 22 calculates $\beta$ (=$(\Delta l_R/\Delta l_D)\cdot\alpha$). If it is determined in step 204 that $\beta>0$, the enlargement/reduction processor 22 performs enlargement processing in step 205; if $\beta=0$, it performs equal magnification processing in step 206; if $\beta<0$, it performs reduction processing in step 207.

The enlargement processing and reduction processing can employ a known method. For example, an interpolation method is a typical method. As the interpolation method, a linear interpolation method, a quadratic function interpolation method, a parabolic mixing method, etc., are available. These methods are described in detail in David F. Rogers, J. Alan Adams, Mathematical Elements for Computer Graphics, McGraw-Hill, Inc, 1976.

As described above, an original image is subjected to enlargement/reduction processing on the basis of $\beta$. The processed image is sent to the frame memory 23 in step 208. The processed image from the frame memory 23 is converted into an analog image signal by the D/A converter 24, and the analog signal is displayed on the display 25 in step 209.

Figure 5:
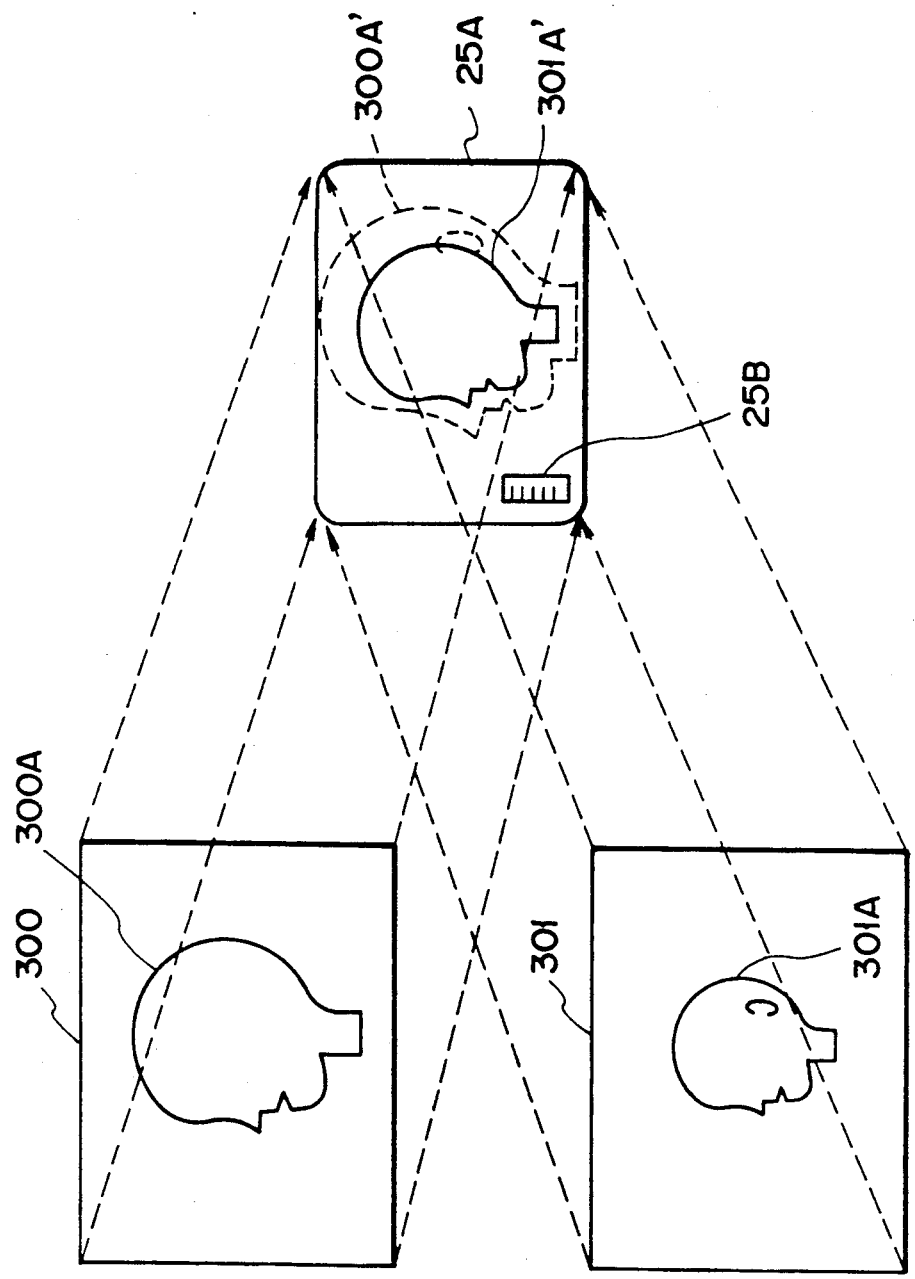
FIG. 5 is a view showing a state wherein first and second original images having different original image size data $S_R$, original image pixel data $\Delta l_R$, and magnification data $\alpha$ with respect to an object are displayed on a display as images having a given ratio.

As can be understood from FIG. 5, first and second images 300 and 301 having different original image size data $S_R$, original image pixel data $\Delta l_R$, and magnification data $\alpha$ with respect to an object can be displayed on a display as images at a given ratio. An object image 300A in the first original image 300 is indicated by a broken-line image 300A' in the screen 25A. An object image 301A in the second original image 301 is indicated by a solid-line image 301A' in the screen 25A. The broken- and solid-line images 300A' and 301A' have a constant ratio with respect to the object. When a scale 25B is displayed on the screen 25A, the broken- and solid-line images 300A' and 301A' can be more easily compared.

Figure 6:
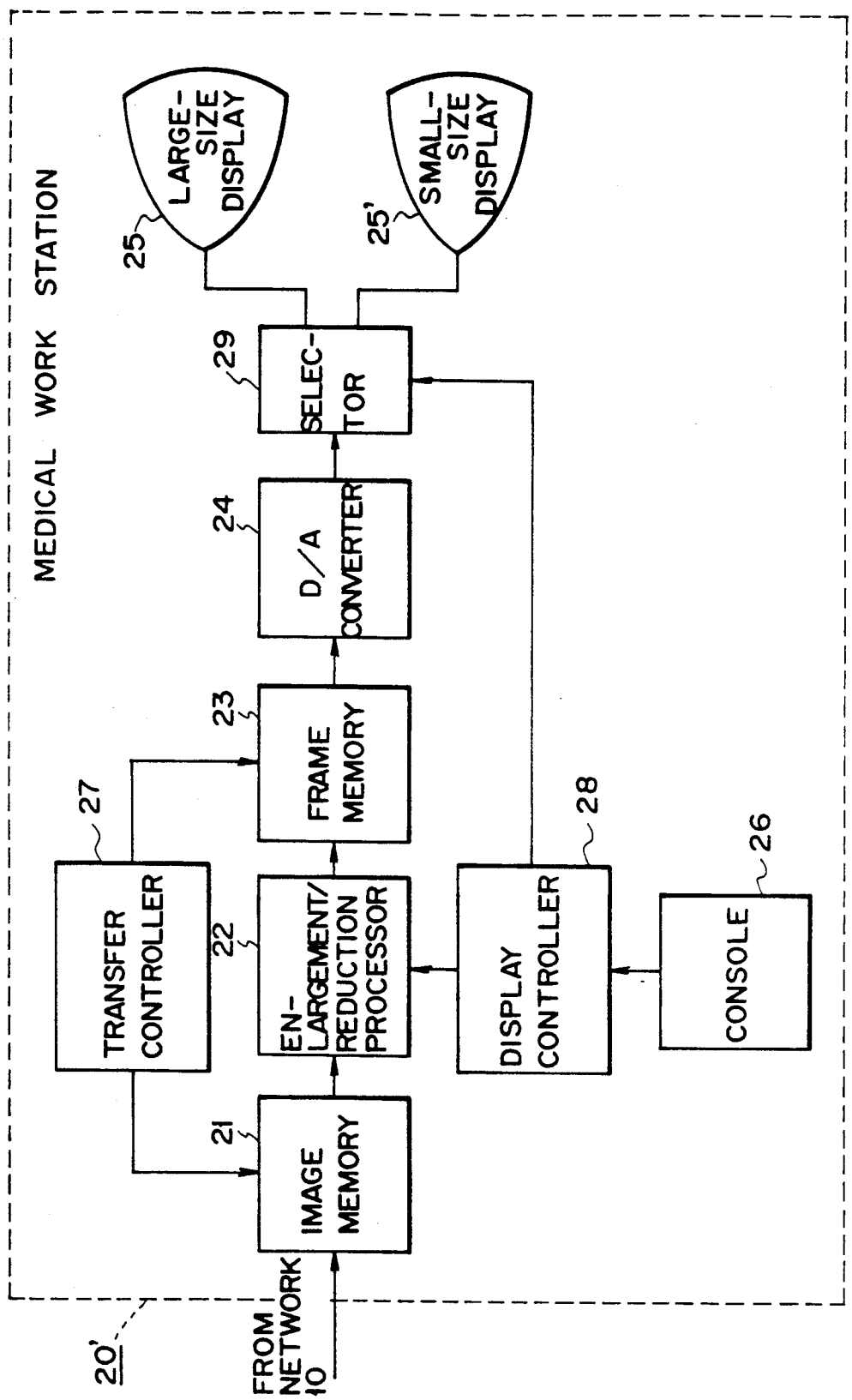
FIG. 6 is a block diagram showing the second embodiment of a medical work station having large- and small-size displays which can be connected to the image network system shown in FIG. 1.

A work station 20' which can selectively use a large-size CRT display 25 and a small-size CRT display 25' will be described below with reference to FIG. 6. In the work station 20' shown in FIG. 6, the large- and small-size CRT displays 25 and 25' are connected to the D/A converter 24 via a selector 29. The selector 29 is switched by the console 26. Enlargement/reduction processing is performed as follows in synchronism with the switching operation of the selector 29. More specifically, an image size $\Delta l_D$ of a display screen 25A' of the small-size CRT display 25' is 240 μm if a 15" CRT display 25' is assumed to be used. An image size $\Delta l_R$ of original image data is 400 μm. At this time, if a display magnification $\alpha=3$, an enlargement/reduction ratio $\beta$ to be calculated by the display controller 28 is 5. Therefore, a ×5 enlarged image having the same size as a ×4 enlarged image on the display screen 25A of the large-size CRT display 25 is displayed on the display screen 25A' of the small-size CRT display 25'. Thus, a doctor who reads images can compare images having the same size and displayed on the display screens 25A and 25A' of the CRT displays 25 and 25' having different sizes to perform an image reading operation.

In this manner, according to the work station 20, images can be displayed in a given scale even when original image data have different pixel sizes of original pixel data, and CRT displays have different pixel sizes, as long as an operator sets a constant display magnification $\alpha$. Therefore, an operator can easily make direct judgment independently of a scale displayed on the display screen, thus improving diagnostic efficiency.

In an application of the above-mentioned medical work station, when images having different modalities such as an MRI image, an SPECT image, an X-ray image, an ultrasonic image, and the like are simultaneously displayed to overlap each other, or to be compared with each other, since a constant display size can be obtained, diagnostic efficiency can be improved. When images which were imaged at different timings by different devices are compared by overlapping them each other, the diagnostic efficiency can be similarly improved.

Figure 7:
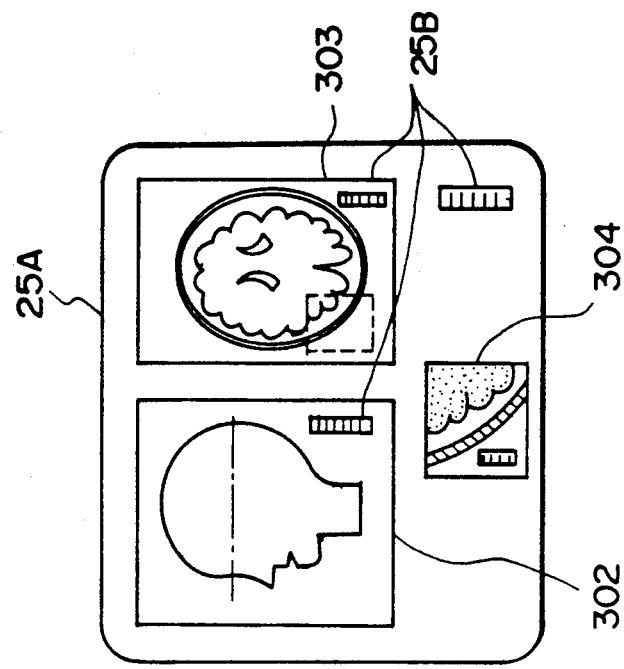
FIG. 7 is a view showing a multi-window display operation by the medical work station.
Figure 8:
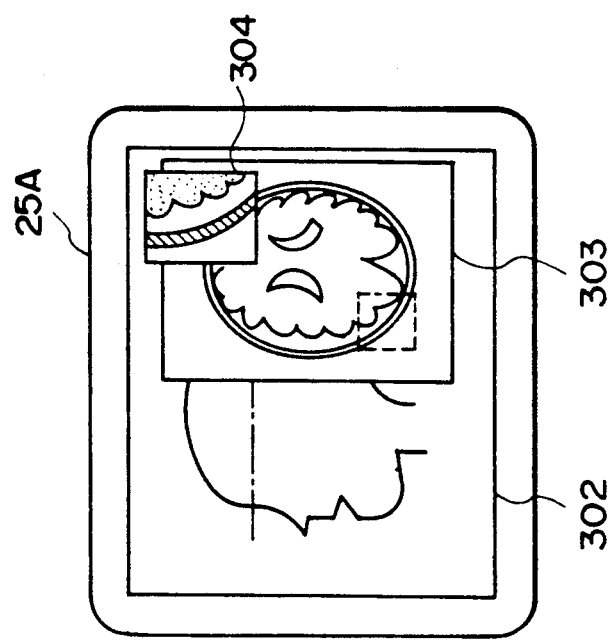
FIG. 8 is a view showing a multi-display operation by the medical work station.

In the above embodiment, one image is displayed on one screen. FIGS. 7 and 8 show cases wherein a plurality of images are displayed on a single screen. FIG. 7 exemplifies a multi-window display mode, and FIG. 8 exemplifies a multi-display mode. In the multi-window display mode shown in FIG. 7, images 302, 303, and 304 are displayed on the screen 25A to partially overlap each other. The images 302 and 303 are subjected to the enlargement/reduction processing of the present invention. The image 304 is an enlarged image of a broken-line portion of the image 303. This enlarged image can also be subjected to the enlargement/reduction processing of the present invention. In the multi-display mode shown in FIG. 8, images 302, 303, and 304 are displayed on the screen 25A without overlapping each other. In this mode, the images 302 and 303 are subjected to the enlargement/reduction processing of the present invention. The image 304 is an enlarged image of a broken-line portion of the image 303. This enlarged image can also be subjected to the enlargement/reduction processing of the present invention. When a scale 25B is displayed on the screen 25A, an object can be recognized with high precision on the basis of the images 302, 303, and 304.

Figure 9:
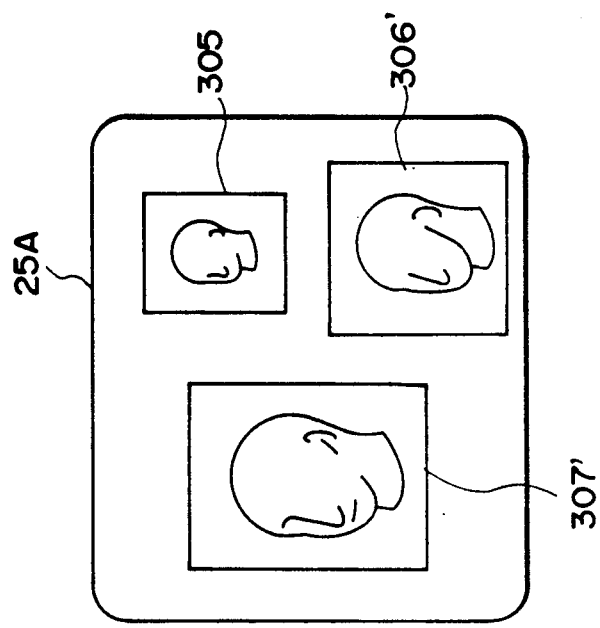
FIG. 9 is a view showing a multi-display operation of a plurality of re-projected images by the medical work station of the present invention.
Figure 9:
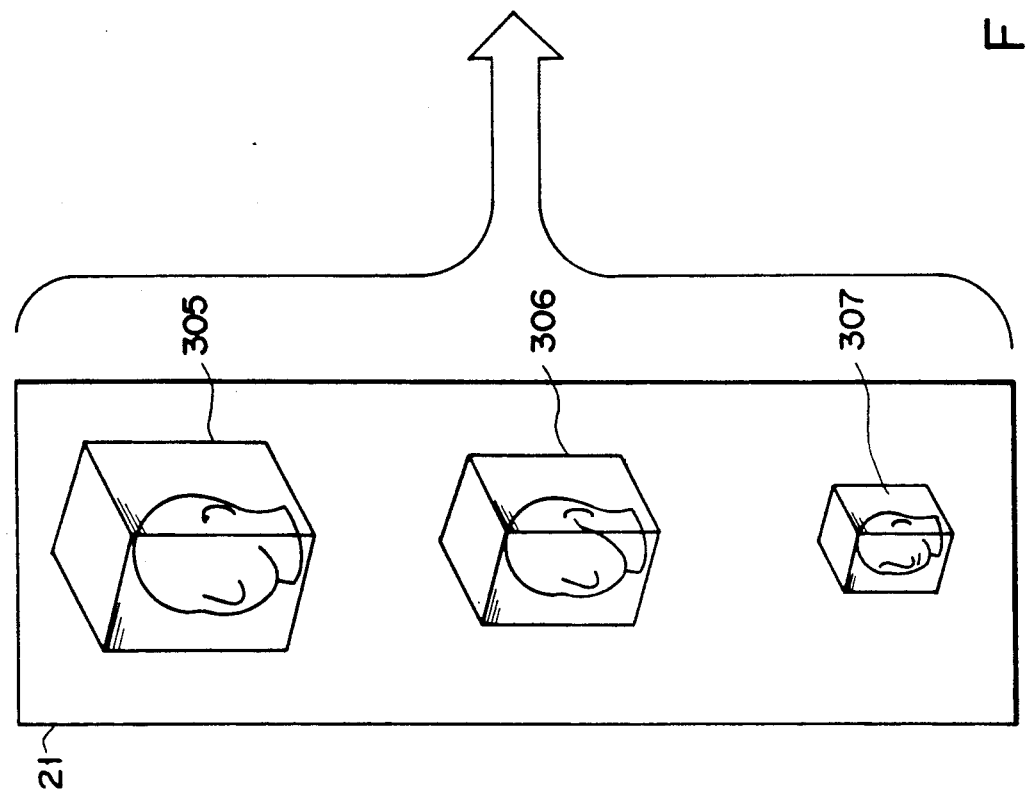

FIG. 9 shows a case wherein the enlargement/reduction processing of the present invention is applied to a plurality of re-projected images obtained from three-dimensional image data. The image memory 21 stores re-projected images 305, 306, and 307 obtained from three-dimensional image data. These re-projected images 305, 306, and 307 are subjected to the enlargement/reduction processing of the present invention, and processed re-projected images 305', 306', and 307' are multi-displayed on the screen 25A.

In the above embodiment, the pixel size data $\Delta l_R$ and $\Delta l_D$ are used as image size data of an original image and a display screen. However, size data $S_R$ and $S_D$ representing the sizes of the overall original image and display screen may be used. In this case, $\beta=(S_R/S_D)\cdot\alpha$.

As described in detail above, according to the present invention, since images can be displayed at a constant ratio even if original image data have different original image data sizes, and display screens have different display screen sizes, an image display apparatus which can improve diagnostic efficiency can be provided.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image display apparatus comprising:
   storage means for storing at least one original image defined by predetermined original image parameters including at least original image size data $S_R$, original image pixel size data $\Delta l_R$, and magnification data $\alpha$ with respect to an object;
   display means for displaying an externally supplied image which is defined by predetermined display parameters including at least display size data $S_D$ and display pixel size data $\Delta l_D$; and
   changing means for reading out the original image stored in said storage means, changing the image parameters of the readout original image in association with the display parameters, and supplying the image whose image parameters are changed to said display means.

2. An apparatus according to claim 1, wherein said changing means performs enlargement/reduction processing of the original image so that a ratio of a size of the original image to a display screen size of said display means is constant.

3. An apparatus according to claim 2, wherein said enlargement/reduction processing is executed by enlarging/reducing the original image at a magnification $\beta = (\Delta l_R / \Delta l_D) \times \alpha$.

4. An apparatus according to claim 2, wherein said enlargement/reduction processing is executed by enlarging/reducing the original image at a magnification $\beta (= (S_R / S_D) \times \alpha)$.

5. An apparatus according to claim 1, wherein said storage means stores a plurality of images from different image acquisition apparatuses as original images.

6. An apparatus according to claim 1 or 5, wherein the original image is at least one of a scano image, a planar image, a tomographic image, a three-dimensional image, and a re-projected image.

7. An apparatus according to claim 6, wherein the original image stored in said storage means is obtained by adding a scale corresponding to an object to an object image.

8. An apparatus according to claim 1, wherein the image displayed on said display means is obtained by adding a scale corresponding to an object to an object image.

9. An apparatus according to claim 1, wherein said display means includes means for executing at least one of a clip mode and an overlap mode.

10. An apparatus according to claim 1, wherein said display means includes means for performing a multi-window display operation of a plurality of images whose image parameters are changed.

11. An apparatus according to claim 10, wherein said means for performing the multi-window display operation includes adjustment means for adjusting window sizes.

12. An apparatus according to claim 1, wherein said display means includes means for performing a multi-display operation of a plurality of images whose image parameters are changed.

13. An apparatus according to claim 12, wherein said means for performing the multi-display operation includes adjustment means for adjusting window sizes.

14. An apparatus according to claim 1, wherein the original image size data $S_R$, the original image pixel size data $\Delta l_R$, the magnification data $\alpha$, the display size data $S_D$, and the display pixel size data $\Delta l_D$ are manually input to said changing means.

15. An apparatus according to claim 1, wherein the original image size data $S_R$, the original image pixel size data $\Delta l_R$, the magnification data $\alpha$, the display size data $S_D$, and the display pixel size data $\Delta l_D$ are automatically input to said changing means.

16. An apparatus according to claim 15, wherein the automatic input operation of the original image size data $S_R$, the original image pixel size data $\Delta l_R$, the magnification data $\alpha$, the display size data $S_D$, and the display pixel size data $\Delta l_D$ is realized in such a manner that the original image size data $S_R$, the original image pixel size data $\Delta l_R$, and the magnification data $\alpha$ are added to the original image, and the display size data $S_D$ and the display pixel size data $\Delta l_D$ are held in said changing means as data.

17. An apparatus according to claim 1, wherein the magnification $\alpha$ is one of a plurality of fixed values which are set in advance.

18. An image network system comprising:
   a work station including
      storage means for storing at least one original image defined by predetermined original image parameters including at least original image size data $S_R$, original image pixel size data $\Delta l_R$, and magnification data $\alpha$ with respect to an object,
      display means for displaying an externally supplied image which is defined by predetermined display parameters including at least display size data $S_D$ and display pixel size data $\Delta l_D$, and
      changing means for reading out the original image stored in aid storage means, changing the image parameters of the readout original image in association with the display parameters, and supplying the image whose image parameters are changed to said display means;
   a plurality of image input apparatuses;
   at least one image database; and
   a network for connecting said work station, said plurality of image input apparatuses, and said at least one image database.

19. A system according to claim 18, wherein at least one of said image input apparatuses comprises a modem for interfacing with a communication network.

20. A system according to claim 18, wherein said image input apparatuses comprise medical imaging apparatuses of different types.

21. A system according to claim 18, wherein said changing means enlarges/reduces the original image at a magnification $\beta (= (\Delta l_R / \Delta l_D) \times \alpha)$ so that a ratio of a size of the original image to a display screen size of said display means is constant.

22. A system according to claim 18, wherein said changing means enlarges/reduces the original image at a magnification $\beta (= (S_R / S_D) \times \alpha)$ so that a ratio of a size of the original image to a display screen size of said display means is constant.

23. A system according to claim 18, wherein said display means includes means for performing a multi-window display operation of a plurality of images whose image parameters are changed.

24. A system according to claim 18, wherein said display means includes means for performing a multi-display operation of a plurality of images whose image parameters are changed.

25. A system according to claim 18, wherein the original image size data $S_R$, the original image pixel size data $\Delta l_R$, the magnification data $\alpha$, the display size data $S_D$, and the display pixel size data $\Delta l_D$ are manually input to said changing means.

26. A system according to claim 18, wherein the original image size data $S_R$, the original image pixel size data $\Delta l_R$, the magnification data $\alpha$, the display size data $S_D$, and the display pixel size data $\Delta l_D$ are automatically input to said changing means.

* * * * *